Feb. 28, 1967     D. J. PROPPS     3,307,086
SEALED CAPACITOR WITH FLUID PASSAGEWAY THROUGH ELECTRODE
Filed Sept. 9, 1964     2 Sheets-Sheet 1

INVENTOR.
DAVID J. PROPPS
BY Robert Gerin
ATTORNEY

Feb. 28, 1967 D. J. PROPPS 3,307,086
SEALED CAPACITOR WITH FLUID PASSAGEWAY THROUGH ELECTRODE
Filed Sept. 9, 1964 2 Sheets-Sheet 2
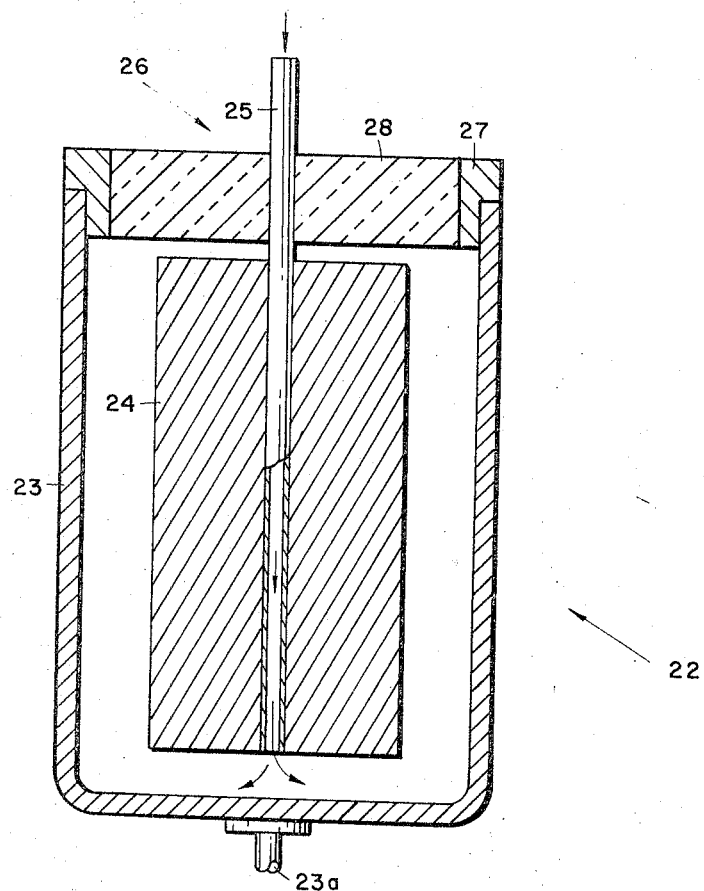
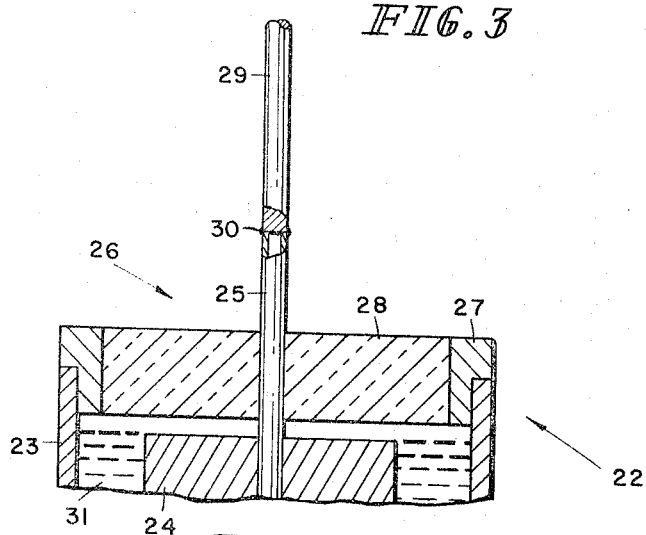
INVENTOR.
DAVID J. PROPPS
BY Robert Levine
ATTORNEY

United States Patent Office 3,307,086
Patented Feb. 28, 1967

3,307,086
SEALED CAPACITOR WITH FLUID PASSAGEWAY
THROUGH ELECTRODE
David J. Propps, Indianapolis, Ind., assignor to P. R.
Mallory & Co., Inc., Indianapolis, Ind., a corporation of Delaware
Filed Sept. 9, 1964, Ser. No. 395,134
8 Claims. (Cl. 317—230)

The present invention relates to electrolytic capacitors, and more particularly relates to a method of producing hermetically sealed, miniature, single case liquid electrolyte, sintered slug tantalum capacitors.

It is known in the art to provide hermetic seals for liquid electrolytic capacitors by mechanically crimping the end of a metal case over a glass to metal seal and soldering the case to the seal. While the known method provides satisfactory hermetic seals, it has a number of disadvantages. In the known methods, the capacitor seal is dependent upon an elastomeric material which loses its ability to maintain an effective seal under environmental conditions of extended life at elevated temperatures. Further, because of the strain characteristics of metals, only certain ones can be used together to provide a glass to metal hermetic seal. The metals presently used are iron and a nickel-iron alloy. If the electrolyte seeps past the elastomer seal, the metal in the glass to metal seal is subject to corrosion, and a low resistance leakage path may form across the glass, causing electrical shorting of the capacitor.

A further disadvantage in this structure is that the operating electrolyte must be dispensed before crimping the closure. This results either in electrolyte creepage to the seal or in an inadequate fill in a number of units.

It is therefore an object of the present invention to provide a means for hermetically sealing liquid electrolytic capacitors which overcome the disadvantages of prior art.

It is an object of the present invention to provide an improved means for hermetically sealing liquid electrolytic capacitors.

It is an object of the present invention to provide a corrosion resistant hermetic seal for miniature, single case, liquid sintered slug tantalum capacitors.

It is an object of the present invention to provide a means for dry assembling an electrolytic capacitor, vacuum impregnating the electrolyte and hermetically sealing The present invention, in another of its aspects, relates to the novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangement and cooperation of elements as hereinafter described, and more particularly as defined in the appended claims.
the capacitor.

For a fuller understanding of the nature and objects of the invention, reference has been made to the following detailed description, taken in conjunction with the accompanying drawings in which:

FIGURE 3 is a cross-section of another embodiment of the present invention prior to electrolyte impregnation.

FIGURE 4 is a cross-sectional view of the completed hermetic seal of FIGURE 3.

Generally speaking, the present invention provides a method of producing a hermetically sealed, miniature, single case, liquid electrolyte, sintered slug tantalum capacitor. The capacitor comprising a metal can and a tantalum anode, has a corrosion resistant terminal assembly consisting of an outer metal ferrule, a center pin and an insulating material between the outer ferrule and the center pin. The center pin is hollow so as to permit vacuum impregnation of the electrolyte after the capacitor has been assembled. The pin is then crimped and welded shut, and a suitable lead welded thereto.

Figure 1:
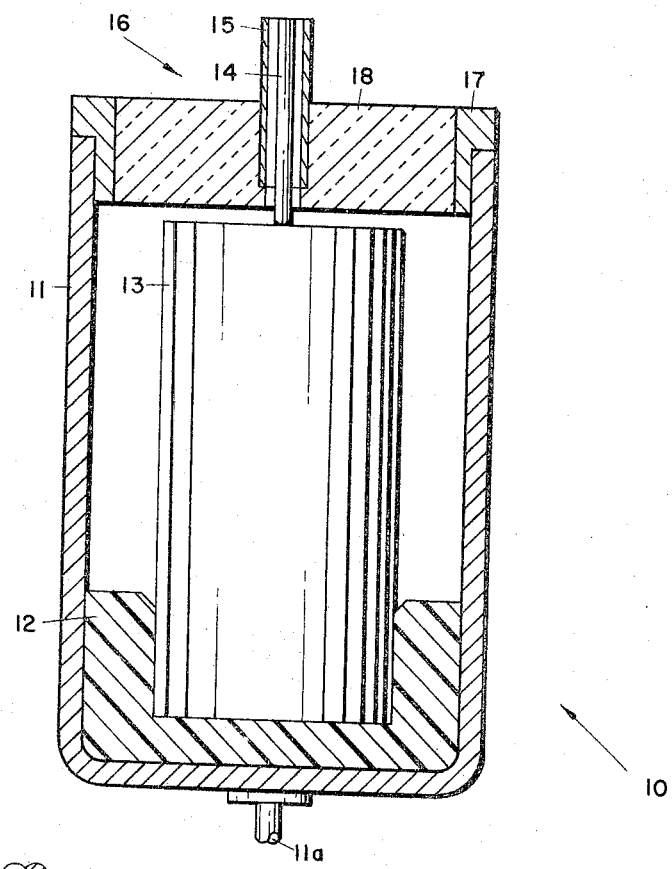
FIGURE 1 is a cross-sectional view of one embodiment of the assembled capacitor prior to electrolyte impregnation.

In order to more fully understand the present invention, reference is now made to FIGURE 1. Capacitor 10 comprises a cathode can 11 which is preferably silver, to which cathode lead 11a is attached. Anode support 12 is placed in the lower extremity of can 11 and tantalum anode 13 positioned therein. A corrosion resistant seal terminal assembly 16 which consists of a hollow center pin 15 of corrosion resistant metal such as tantalum and an outer metal ring 17 of a corrosion resistant metal such as silver, separated by a corrosion resistant insulating material 18, such as glass-bonded mica, is positioned over anode riser 14 and welded into place.

Figure 2:
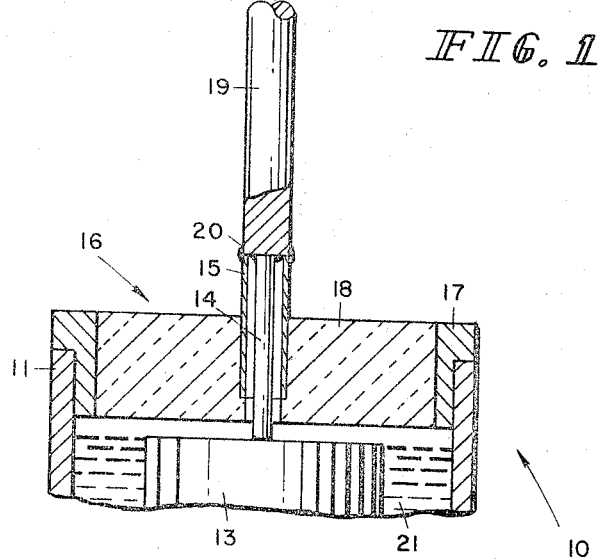
FIGURE 2 is a cross sectional view of the completed hermetic seal of FIGURE 1.

FIGURE 2 shows the completed hermetic seal construction. After liquid electrolyte 21 has been drawn into capacitor 10 by vacuum impregnation techniques, center pin 17 is crimped and welded shut. A suitable lead 19 is then welded to the crimped center pin, thus insuring electrical contact and a good seal.

The aforedescribed method eliminates the need for elastomeric sealing materials, thus reducing the total number of parts required. By reducing the number of parts used in the capacitor, an advantage is gained in the flexibility of a given size, particularly in increasing the volume efficiency of a given capacitor. As the capacitor is assembled dry, it may be assembled in a horizontal or vertical position. Further, as the capacitor contains no electrolyte or elastomeric material, when the unit is welded, the heat produced will not affect the reliability of the capacitor. A further advantage resides in the utilization of the maximum capacity of the tantalum anode when the capacitor is vacuum impregnated and then sealed, thus eliminating directional differences in performance.

Another advantage of the present invention is that the materials used are all acid-resistant and non-corrosive, and as a dielectric oxide is formed on both the anode 13 and the center pin 15, there is no danger of low resistance leakage paths from center pin 15 to outer ring 17.

FIGURE 3 shows another embodiment of the present invention wherein the anode 24 and the seal unit 26 of capacitor 22 are preformed into an integral part. In this embodiment, a hollow anode riser 26 extends from seal unit 26 comprising a silver gasket 27 and a glass bonded mica disk 28 through anode 24. The entire seal-anode unit is placed into cathode can 23 and welded into place. Cathode lead 23a is welded into position, and capacitor 22 is inverted and vacuum impregnated with electrolyte.

FIGURE 4 shows the completed hermetic seal assembly 26. After liquid electrolyte 31 has been introduced into assembled capacitor 22, hollow anode riser 25 is crimped and welded shut. A suitable lead 29 is then welded to anode riser 25 at weld junction 30, completing the hermetic sealing of capacitor 22. As can be seen from the drawings, the ease of assemblying and the greater accuracy of electrolyte fill afforded by the present invention will allow considerable savings during the manufacture of said capacitors.

Since many widely different embodiments of invention may be made without departing from the scope thereof, it is intended that all matter contained in the above description and shown in the accompanying drawings shall be interposed as illustrative and not in a limiting sense. Having thus described my invention, I claim:

1. An electrolytic capacitor comprising a container with a closed end and an open end, an electrolyte in said container, an anode of film-forming metal immersed in said electrolyte and having an integral hollow anode riser forming a passage therethrough, said anode riser including a terminal portion projecting from said anode through the open end of said container, and an insulative cap closing the open end of said container with said terminal portion extending through the cap, said cap being secured to said terminal portion and to the open end of said container forming a seal.

2. An electrolytic capacitor comprising a container with a closed end and an open end, an electrolyte in said container, an anode of film-forming metal immersed in said electrolyte and having an integral hollow anode riser forming a passage therethrough, said anode riser including a terminal portion projecting from said anode through the open end of said container, an insulative cap closing the open end of said container with said terminal portion extending through the cap, said cap being secured to said terminal portion and to the open end of said container forming a seal and a second terminal connected to said closed end of said container.

3. An electrolytic capacitor comprising a container with a closed end and an open end, an electrolyte in said container, an anode of film-forming metal immersed in said electrolyte and having an integral hollow anode riser forming a passage therethrough, said anode riser including a terminal portion projecting from said anode through the open end of said container, an insulative cap closing the open end of said container with said terminal portion extending through the cap, said cap being secured to said terminal portion and to the open end of said container forming a glass-to-metal seal.

4. An electrolytic capacitor comprising a container with a closed end and an open end, a longitudinally apertured tantalum anode having a dielectric film formed thereon and positioned in said container so that said anode is spaced from the inner periphery of said container, a hollow anode riser interfitting with said aperture of said tantalum anode forming a passage therethrough, said anode riser including a terminal portion projecting from said tantalum anode through the open end of said container, an insulative cap closing the open end of said container with said terminal portion extending through the cap, said cap being secured to said terminal portion and to the open end of said container forming a seal, electrolyte introduced into said container through said hollow anode riser immersing said tantalum anode, and a lead connected to the extremity of said anode riser extending through said cap closing said hollow anode riser.

5. A sealed electrolytic capacitor comprising: a metal cathode can having an open end, a liquid electrolyte in the can and an anode of film-forming metal immersed in said electrolyte, a seal unit having an outer metal ring and a hollow center pin of film-forming metal, said center pin integrally secured to and extending through the length of said anode providing a passage for electrolyte, said outer ring and said center pin being separated by an insulating cap, said pin, ring and insulating cap being an integrally formed seal unit, said unit fitting into the open end of and being welded to said cathode can, said center pin being crimped and welded and a metal lead welded to said pin.

6. A sealed electrolytic capacitor comprising: a metal cathode can having an open end, a longitudinally apertured tantalum anode having a dielectric film formed thereon and positioned in said can so that said anode is spaced from the inner walls of said can, a seal unit having an outer metal ring and a hollow anode riser integrally secured to and extending through the length of said tantalum anode, said outer ring and said anode riser being separated by an insulating cap, said anode riser, ring and insulating cap being an integrally formed seal unit, said unit fitting into the open end of and being welded to said cathode can, electrolyte introduced into said can through said hollow anode riser immersing said tantalum anode, said anode riser being crimped and welded, and a metal lead welded to said anode riser.

7. A sealed electrolytic capacitor comprising: a metal cathode can having an open end, a longitudinally apertured tantalum anode having a dielectric film formed thereon and positioned in said can so that said anode is spaced from the inner walls of said can, a seal unit having an outer silver ring and a hollow anode riser integrally secured to and extending the length of said aperture of said tantalum anode, said outer ring and said anode riser being separated by a glass-bonded mica cap, said anode riser, ring and glass-bonded mica cap being an integrally formed seal unit, said unit fitting into the open end of and being welded to said cathode can, electrolyte introduced into said can through said hollow anode riser immersing said tantalum anode, said anode riser being crimped and welded and a metal lead welded to said anode riser.

8. A hermetically sealed electrolytic capacitor comprising: a metal cathode can having an open end, a longitudinally apertured tantalum anode having a dielectric film formed thereon and positioned in said can so that said anode is spaced from the inner walls of said can, a seal unit having an outer silver ring and a hollow anode riser integrally secured to and extending through the length of said aperture of said tantalum anode, said outer ring and said anode riser being separated by a glass-bonded mica cap, said anode riser, ring and glass-bonded mica cap being an integrally formed seal unit, said unit fitting into the open end of and being welded to said cathode can, electrolyte introduced into said can through said hollow anode riser immersing said tantalum anode, said anode riser being crimped and welded, a metal lead welded to said anode riser, and a second metal lead welded to said closed end of said can.

References Cited by the Examiner

UNITED STATES PATENTS

| | | | |
|---|---|---|---|
| 2,628,271 | 2/1953 | Brafman | 317—230 |
| 2,869,052 | 1/1959 | Ness et al. | 317—230 |
| 3,196,323 | 7/1965 | Rogers et al. | 317—230 |
| 3,255,386 | 6/1966 | Millard et al. | 317—230 |
| 3,255,387 | 7/1966 | Giacomello | 317—230 |

JAMES D. KALLAM, *Primary Examiner.*